United States Patent [19]

Ushiro

[11] Patent Number: 5,090,800
[45] Date of Patent: Feb. 25, 1992

[54] PROJECTOR HAVING A LIQUID CRYSTAL DISPLAY PANEL

[75] Inventor: Seimei Ushiro, Tokyo, Japan

[73] Assignee: Fuji Photo Film Co., Ltd., Kanagawa, Japan

[21] Appl. No.: 694,687

[22] Filed: May 2, 1991

[30] Foreign Application Priority Data

May 24, 1990 [JP] Japan ............................. 2-54369[U]

[51] Int. Cl.$^5$ .......................................... G03B 21/10
[52] U.S. Cl. ........................ 353/071; 353/74; 353/77; 353/119; 353/DIG. 3
[58] Field of Search ............. 353/74, 76, 77, 78, 353/72, 73, 71, 119, 98, DIG. 3, 79, 122

[56] References Cited

U.S. PATENT DOCUMENTS

| | | | |
|---|---|---|---|
| 3,387,535 | 6/1968 | Bennett | 353/71 |
| 3,479,116 | 11/1969 | Anderson | 353/77 |
| 3,899,246 | 8/1975 | Edelstein | 353/72 |
| 3,904,286 | 9/1975 | Omi et al. | 353/71 |
| 4,030,821 | 6/1977 | Badalich | 353/78 |
| 4,140,377 | 2/1979 | Hoadley | 353/78 |
| 4,163,610 | 8/1979 | Sanderson | 353/71 |

*Primary Examiner*—William A. Cuchlinski, Jr.
*Assistant Examiner*—William C. Dowling
*Attorney, Agent, or Firm*—Young & Thompson

[57] ABSTRACT

On the outside of a body of a projector, an LCD is provided for displaying an image. A lamp is incorporated in the projector body for illuminating from the rear an image displayed on the LCD. A movable member is provided on the outside of the projector body for vertical swinging movement between open and closed states, and, in the closed state, allows the LCD to be directly observed. A projecting head is provided on the movable member for projecting, in the open state, the image illuminated by the lamp onto a screen outside the projector body.

14 Claims, 3 Drawing Sheets

PROJECTOR HAVING A LIQUID CRYSTAL DISPLAY PANEL

BACKGROUND OF THE INVENTION

1. Field of the Invention

The present invention relates to a projector having a liquid crystal display panel, more particularly to an LCD projector capable both of projecting an image to an external screen and of displaying a directly observable image.

2. Description of the Prior Art

Liquid crystal display panels (herein referred to as LCDs) have recently come into widespread use as devices for displaying images. An LCD is thin, easily manufactured, small and light in weight, and consumes a rather small amount of electric power. These advantages enlarge the field of use of LCDs. An LCD projector is known, in which an image displayed on an LCD is projected by a projecting lens system onto a screen. An LCD is also widespread in use as an apparatus for directly displaying an observable image with a word processor.

An LCD, however, in any conventional display apparatus is used simply either for projecting an image or for directly displaying an image. It is difficult to directly observe an image displayed on an LCD of a projecting apparatus, because the brightness of the image is so great as to be masked by glare from the naked eye. It is also difficult to project an image displayed on an LCD of an observable image display apparatus, because the brightness of the image is too low for projection onto a screen.

SUMMARY OF THE INVENTION

It is therefore an object of the present invention to provide an LCD projector capable of serving also as an apparatus for directly displaying an observable image.

It is another object of the present invention to provide an LCD projector which is readily portable.

In order to achieve the above and other objects and advantages of this invention, a projector is proposed which comprises: a projector body; electro-optical display means provided on the outside of the projector body for displaying an image; a light source incorporated in the projector body for illuminating the image displayed on the electro-optical display means from the rear; a movable member provided on the outside of the projector body movably between an open state and a closed state, the movable member in the closed state allowing the electro-optical display means to be directly observed; and a projecting head provided on the movable member for projecting in the open state of the movable member the image illuminated by the light source onto a screen outside the projector body. According to a preferred embodiment, a lens is mounted in the movable member, and is positioned, when the movable member is closed, in front of an LCD constituting the electro-optical display means for enlarging the image.

Thanks to the present invention, an LCD projector can serve also as an apparatus for directly displaying an observable image, and is readily portable.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
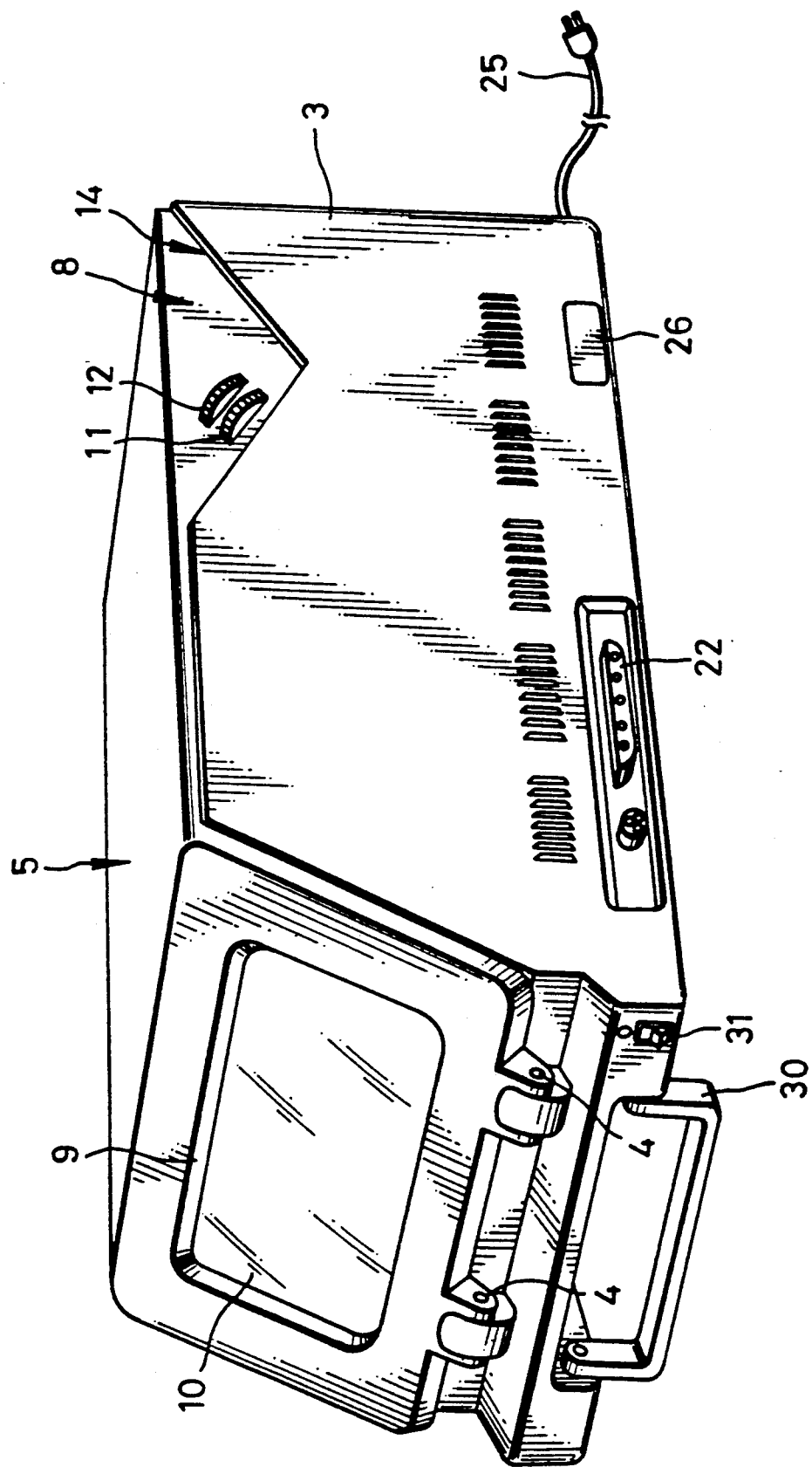
FIG. 1 is a perspective view illustrating an LCD projector embodying the present invention.
Figure 2:
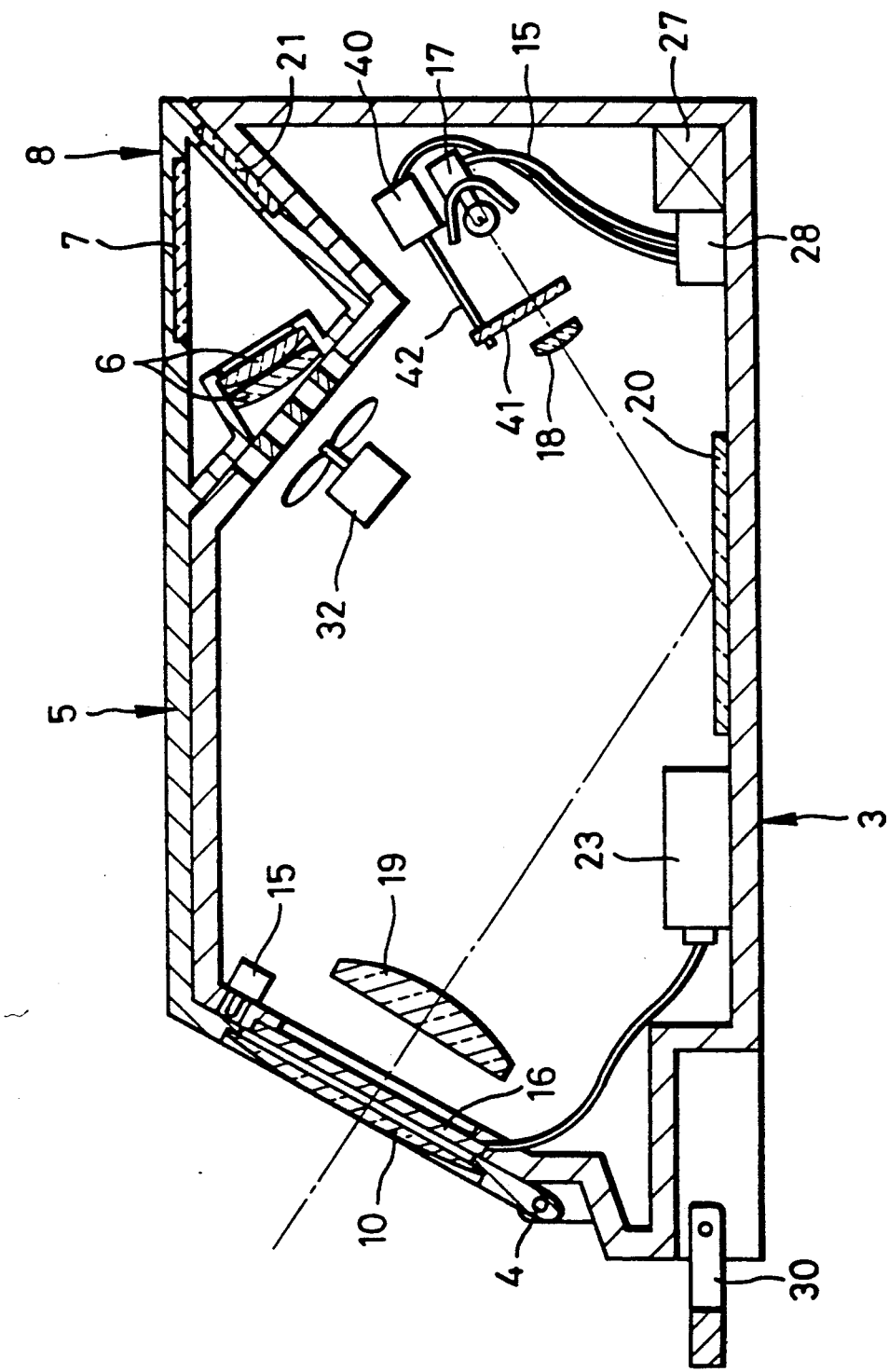
FIG. 2 is a sectional view of the LCD projector illustrated in FIG. 1, with the projecting head lowered.

In FIGS. 1 and 2 illustrating and LCD projector, there is shown a movable member 5 supported on a projector body 3 for vertical swinging movement on a shaft 4 on a lower front portion of the projector body 3. The free end of the movable member 5 is provided with a projecting head 8 having a projecting lens 6 and a projecting mirror 7 incorporated therein. A transparent plate 21 is fitted on the projecting head 8 for protection against dust. An opening 9 is formed in the movable member 5 near the shaft 4, and has an enlarging lens 10 fitted therein. A focusing dial 11 and a zooming dial 12 are provided on the projecting head 8, and serve for focusing and zooming the projecting lens 6 by a manual operation. When the LCD projector is carried in the hand, the movable member 5 is collapsed or closed, as shown in FIGS. 1 and 2, so as to cover the front and upper side of the projector body 3, such that the projecting head 8 is received in a recess 14 formed on the upper side of the projector body 3 in order to make compact the whole of the LCD projector. A microswitch 15 provided on the front of the projector body 3 is actuated when the movable member 5 covers the projector body 3, to perform a function to be described later.

A liquid crystal display panel or an LCD 16 is fitted in the front side of the projector body 3. When the movable member 5 covers the projector body 3, the enlarging lens 10 is disposed in front of the LCD 16. A lamp 17 is incorporated in the projector body 3 for illuminating the LCD 16 from the rear. Reference numerals 18 and 19 designate condenser lenses, while reference numeral 20 designates a mirror. A diffusion plate 41 is swung by a motor 40, to be described later in detail.

As shown in FIG. 1, input terminals 22 are formed on a lateral side of the projector body 3 for receiving a signal containing image data. The LCD 16 is driven by an LCD driver 23 in accordance with the image signal received by the input terminals 22.

Figure 3:
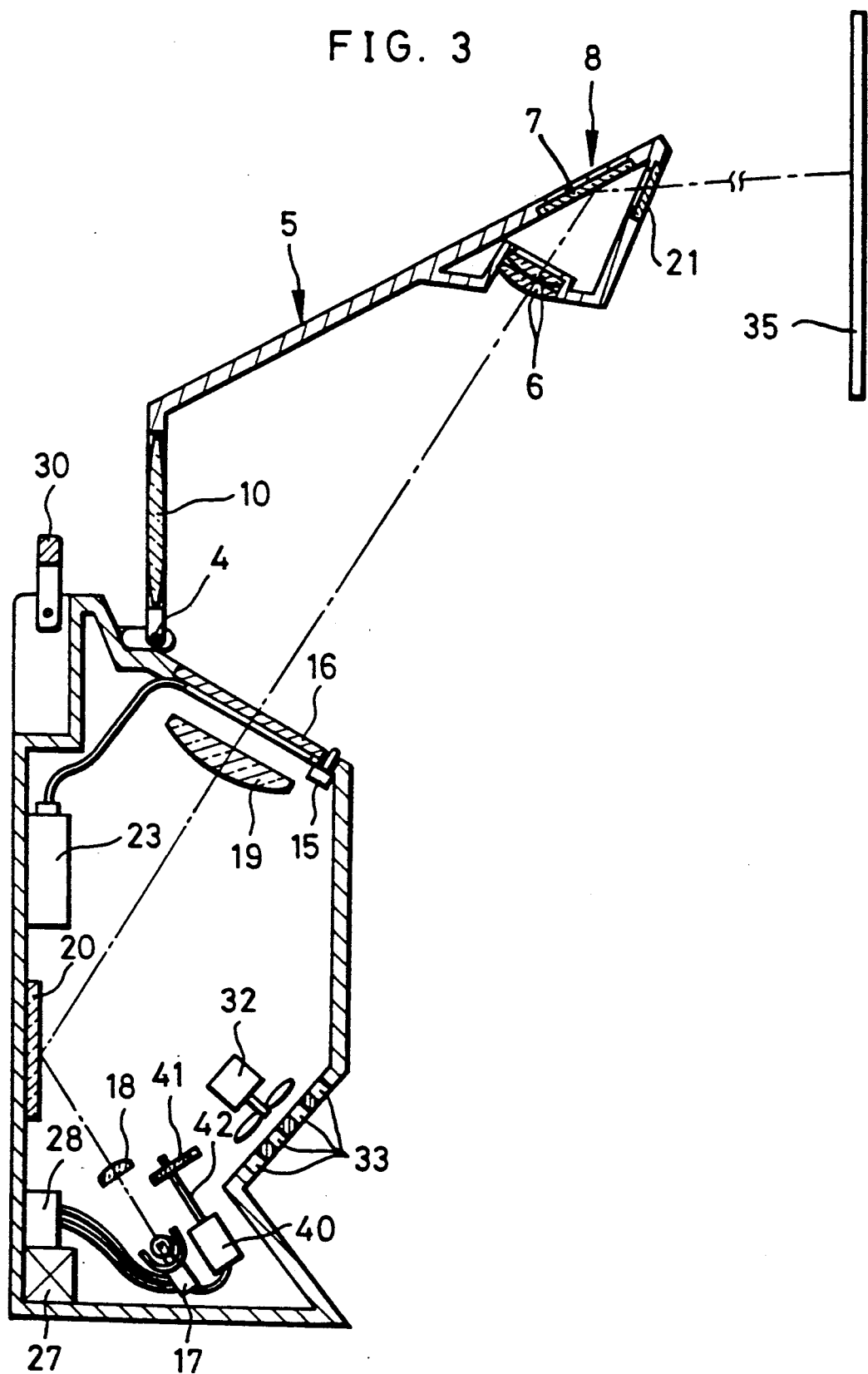
FIG. 3 is a sectional view similar to FIG. 2 but with the projecting head raised.

The LCD projector is driven not only by an AC power source supplied through a power supply line 25 but also by a battery charger 26 incorporated therein. A power source circuit 27 controls the power source so that the battery charger 26 supplies power only when no power is supplied from the power supply line 25. A lamp control circuit 28 controls the diffusion plate 41, which is in the shape of a paddle appearing in FIGS. 2 and 3 in two different rotated positions.

When the microswitch 15 is actuated, the diffusion plate 41 is swung by a shaft 42 of the motor 40 so as to enter the optical path between the lamp 17 and the condenser lens 18, while the lamp 17 is turned on at a low brightness by the lamp control circuit 28. The diffusion plate 41 serves to uniformly illuminate the whole surface of the LCD 16 by diffusing the light from the lamp 17 when the lamp 17 is actuated at a low brightness, because the low brightness of the peripheral part of the LCD 16 is considerably lower than in the central part at the time of low brightness of the lamp 17.

When the microswitch 15 is not actuated, the diffusion plate 41 is swung out of the optical path, while the lamp 17 is turned on at a high brightness. Although the swinging of the diffusion plate 41 is controlled herein electrically by switching the microswitch 15 on/off, it may alternatively be controlled mechanically by linkage responsive to opening/closing of the movable member 5. The diffusion plate 41 also may be replaced with a sheet-type diffusion member, which is disposed between the LCD 16 and the condenser lens 19 to be wound on a shaft member when out of use.

A grip 30 is pivotally supported on the front bottom portion of the projector body 3, and serves not only for carrying the LCD projector manually, but also for regulating the inclination of the projector body 3 for convenience of directly observing an image on the LCD 16, because the grip 30 has a click stop (not shown) to hold it in the position shown in FIG. 1.

Reference numerals 31 and 32 respectively designate a power switch and a fan for dissipating heat. The fan 32 is driven by a motor and dissipates the heat generated by the lamp 17 through air outlets 33, particularly when the lamp 17 is actuated at a high brightness.

The operation of the present LCD projector will now be described. When it is used as a directly observable display apparatus with a word processor, the input terminals 22 are connected to output terminals of the word processor. The power switch 31 is actuated with the movable member 5 in the closed state. Because the microswitch 15 is actuated, the lamp 17 is actuated at a low brightness by the lamp control circuit 28 so that it is possible to observe directly an image displayed on the LCD 16 free from glare. The enlarging lens 10 disposed in front of the LCD 16 enlarges the image on the LCD 16 which can be recognized easily. If the LCD 16 has a sufficiently large display area, the enlarging lens 1 could be omitted.

When the LCD projector is used as a projecting apparatus in order to project still images taken by an electronic still camera, the input terminals 22 are connected to output terminals of an image reproducing apparatus for an electronic still camera. The projector body 3 is positioned as in FIG. 3, such that the front side faces upward, while the movable member 5 is opened or erected to a predetermined standing position. With the movable member 5 thus open, the end portion supported by the shaft 4 is arrested by a click stop (not shown) so as to retain the movable member 5 in the standing position. The microswitch 15 is turned off in this position, so that the actuation of the power switch 31 actuates the lamp 17 at a high brightness. A still image displayed on the LCD 16 is projected onto a screen 35 by the projecting lens 6 and a projecting mirror 7. The focusing and zooming dials 11 and 12 are operated to focus and zoom the projecting lens 6 by observing the image projected on the screen 35. The image displayed on the LCD 16 is clearly formed on the screen 35 at a desired projecting magnification. The fan 32 is operated upon actuating the lamp 17 with the microswitch 15 off, so as to dissipate the heat of the lamp 17 to the ambient.

It is necessary, for projecting the image on the LCD 16 onto the screen 35, to illuminate the LCD 16 at a high brightness. The open state of the movable member 5 is detected by the microswitch 15 so that it is possible to change the brightness of the lamp 17 automatically. When the image of the LCD 16 is externally projected, higher power is needed for high brightness of the lamp 17, so that the battery charger 26 is insufficient for the projection of the image. It is accordingly preferable to inhibit the lamp 17 from being actuated with the microswitch 15 off, unless power is also supplied form line 25. While power is supplied from the line 25, the battery charger 26 additionally may be powered by the power source circuit 27.

It is possible to project an image of an original on a transparent base onto the screen 35 in a manner of an overhead projector, with an arrangement such that an original is disposed on the front of the LCD 16, and that the open state of the movable member 5 keeps the LCD 16 entirely transparent.

Although the present invention has been fully described by way of the preferred embodiment thereof with reference to the accompanying drawings, various changes and modifications will be apparent to those having skill in this field. Therefore, unless otherwise these changes and modifications depart form the scope of the present invention, they should be construed as being included therein.

What is claimed is:

1. A projector comprising:
   a projector body;
   electro-optical display means provided on the outside of said projector body for displaying an image;
   a light source in said projector body for illuminating from the rear said image displayed on said electro-optical display means;
   a movable member mounted on the outside of said projector body for movement between open and closed states, said movable member in said closed state allowing said electro-optical display means to be directly observed; and
   a projecting head on said movable member for projecting in said open state said image illuminated by said light source onto a screen outside said projector body.

2. A projector as defined in claim 1, wherein said electro-optical display means is a liquid crystal display panel.

3. A projector as defined in claim 2, wherein an illuminating optical system is disposed between said light source and said liquid crystal display panel.

4. A projector as defined in claim 3, wherein said illuminating optical system includes first and second condenser lenses and a mirror disposed between said condenser lenses.

5. A projector as defined in claim 2, wherein said projector body has a base on which the projector rests when said movable member is closed, said liquid crystal display panel being inclined upwardly rearwardly when said projector rests on said base.

6. A projector as defined in claim 5, wherein said projector body has an end on which the projector rests when said movable member is open, said liquid crystal display panel being inclined upwardly rearwardly when said projector rests on said end.

7. A projector as defined in claim 6, wherein said base and said end adjoin and are disposed at a right angle to each other.

8. A projector as defined in claim 1, further comprising a first lens in said projecting head for enlarging said illuminated image.

9. A projector as defined in claim 8, further comprising a mirror in said projecting head for reflecting light which has passed through said first lens toward said screen.

10. A projector as defined in claim 9, further comprising a second lens mounted in said movable member, positioned in said closed state in front of said liquid crystal display panel for enlarging said image.

11. A projector as defined in claim 1, further comprising:
   means for sensing said open and closed states of said movable member; and
   light source control means for determining a brightness of said light source in accordance with an output of said sensing means selectively to be a first value corresponding to said open state or a second value corresponding to said closed state.

12. A projector as defined in claim 11, wherein said first value is greater than said second value.

13. A projector as defined in claim 12, wherein a diffusion plate for diffusing light is inserted in an optical path between said light source and said liquid crystal display panel when said brightness has said second value.

14. A projector as defined in claim 1, wherein said movable member is pivotably mounted on said projector body.

* * * * *